(12) United States Patent
Lee et al.

(10) Patent No.: US 12,110,411 B2
(45) Date of Patent: Oct. 8, 2024

(54) POWDER COATING COMPOSITION

(71) Applicant: KCC CORPORATION, Seoul (KR)

(72) Inventors: Jae Jun Lee, Seoul (KR); Hyeon Ung Wang, Hwaseong-si (KR); Jin Seok Lee, Yongin-si (KR)

(73) Assignee: KCC CORPORATION, Seoul (KR)

( * ) Notice: Subject to any disclaimer, the term of this patent is extended or adjusted under 35 U.S.C. 154(b) by 634 days.

(21) Appl. No.: 17/422,533

(22) PCT Filed: Nov. 20, 2019

(86) PCT No.: PCT/KR2019/015940
§ 371 (c)(1),
(2) Date: Jul. 13, 2021

(87) PCT Pub. No.: WO2020/159048
PCT Pub. Date: Aug. 6, 2020

(65) Prior Publication Data
US 2022/0098434 A1   Mar. 31, 2022

(30) Foreign Application Priority Data
Jan. 28, 2019  (KR) .................. 10-2019-0010768

(51) Int. Cl.
| | | |
|---|---|---|
| *C09D 163/00* | (2006.01) | |
| *C09D 5/03* | (2006.01) | |
| *C09D 7/40* | (2018.01) | |
| *C09D 7/61* | (2018.01) | |
| *C08K 3/013* | (2018.01) | |
| *C08K 3/04* | (2006.01) | |
| *C08K 3/22* | (2006.01) | |
| *C08K 3/30* | (2006.01) | |

(52) U.S. Cl.
CPC ............. *C09D 163/00* (2013.01); *C09D 5/03* (2013.01); *C09D 7/61* (2018.01); *C09D 7/69* (2018.01); *C08K 3/013* (2018.01); *C08K 3/04* (2013.01); *C08K 3/22* (2013.01); *C08K 2003/2241* (2013.01); *C08K 3/30* (2013.01); *C08K 2003/3045* (2013.01)

(58) Field of Classification Search
CPC .......... C09D 163/00; C09D 7/61; C09D 7/69; C09D 5/03; C08K 2003/2241; C08K 2003/3045; C08K 3/013
USPC ........................................................ 524/423
See application file for complete search history.

(56) References Cited

U.S. PATENT DOCUMENTS

| | | |
|---|---|---|
| 4,009,224 A | 2/1977 | Warnken |
| 2006/0014031 A1 | 1/2006 | Ohkoshi |

FOREIGN PATENT DOCUMENTS

| | | | | |
|---|---|---|---|---|
| JP | 2002265864 A | | 9/2002 | |
| KR | 1020100126698 A | | 12/2010 | |
| KR | 1020120077167 A | | 7/2012 | |
| KR | 20150024120 A | * | 3/2015 | |
| KR | 1020180101807 A | | 9/2018 | |
| WO | WO-02081579 A2 | * | 10/2002 | ........... C09D 133/04 |

OTHER PUBLICATIONS

International Search Report from International Application No. PCT/KR2019/015940, Feb. 27, 2020, 6 pages.

* cited by examiner

*Primary Examiner* — Ruiyun Zhang
(74) *Attorney, Agent, or Firm* — Tucker Ellis LLP

(57) ABSTRACT

The present invention relates to a powder coating composition comprising an epoxy resin, a curing agent, a pigment, and a catalyst, wherein the pigment comprises an extender pigment having an average particle size of 1.0 μm to 8.0 μm, and the catalyst comprises an aliphatic imidazole compound and an aromatic imidazole compound.

4 Claims, No Drawings

POWDER COATING COMPOSITION

TECHNICAL FIELD

The present invention relates to a powder coating composition having excellent corrosion resistance.

BACKGROUND ART

Steel pipe coating is intended to prevent corrosion of steel pipes, and it is critical to ensure excellent adhesion between steel pipe substrates and coating films to prevent disbondment or swelling of the coating films due to transfer materials inside the steel pipes. As underwater environments or pipe laying conditions for fluid transportation have become harsher lately, there is a demand for improved thermal, chemical, and physical properties of the coating films, and in particular, there is a rising demand for coatings that meet heat resistance and corrosion resistance requirements in a high temperature setting.

In particular, the standards required by the industry in regards to corrosion resistance are gradually being tightened, and thus, in order to meet the requirements, research and development on powder coatings which have a high crosslinking density, thereby achieving excellent chemical resistance, and prevent moisture absorption, which is the cause of corrosion, thereby achieving excellent boiling water resistance and cathodic disbondment resistance have been continuously conducted.

For example, U.S. Pat. No. 4,009,224 discloses a coating composition containing polyglycidyl ether for improving cathodic disbondment resistance of a coating film. However, the coating composition does not meet the recently strengthened requirements of the industry, and accordingly, there is a continuous demand for a coating composition having excellent boiling water resistance and cathodic disbondment resistance.

DISCLOSURE OF THE INVENTION

Technical Problem

The present invention provides a powder coating composition having excellent corrosion resistance.

Technical Solution

The present invention provides a powder coating composition comprising an epoxy resin, a curing agent, a pigment, and a catalyst, wherein the pigment comprises an extender pigment having an average particle size of 1.0 μm to 8.0 μm, and the catalyst comprises an aliphatic imidazole compound and an aromatic imidazole compound.

Advantageous Effects

The present invention provides a powder coating composition having excellent corrosion resistance. In particular, when the powder coating composition according to the present invention is applied to steel pipes, boiling water resistance and cathodic disbondment resistance are enhanced, which may lead to achieving stable long-term corrosion resistance quality.

BEST MODE FOR CARRYING OUT THE INVENTION

Hereinafter, the present invention will be described in more detail. However, the present description is not intended to limit the invention to the following content, and when necessary, various components can be modified in various manners or can be optionally used together with each other. It is to be understood that the present invention includes all changes, equivalents, and alternatives falling within the spirit and scope of the present invention.

A powder coating composition according to the present invention comprises an epoxy resin, a curing agent, a pigment, and a catalyst, wherein the pigment comprises an extender pigment having an average particle size of 1.0 μm to 8.0 μm, and the catalyst comprises an aliphatic imidazole compound and an aromatic imidazole compound. In addition, the powder coating composition according to the present invention may further comprise additives commonly used in the powder coating field, if needed. The powder coating composition according to the present invention comprises components as follows.

Epoxy Resin

The powder coating composition according to the present invention comprises an epoxy resin as a main resin. The epoxy resin serves to secure heat resistance and corrosion resistance when a coating film is formed.

The epoxy resin is not particularly limited as long as it is a typical epoxy resin known in the art. Non-limiting examples of the epoxy resin, which may be used, include a bisphenol A-type epoxy resin, a bisphenol F-type epoxy resin, a phenol novolac-type epoxy resin, a cresol novolac-type epoxy resin, an aromatic hydrocarbon formaldehyde resin modified phenol resin-type epoxy resin, a triphenyl-methane-type epoxy resin, a tetraphenylethane-type epoxy resin, a dicyclopentadiene phenol addition reaction-type epoxy resin, or a mixture thereof.

For example, the epoxy resin may be a modified bisphenol A-type epoxy resin, and for example, may be one selected from the group consisting of a cresol novolac modified bisphenol A-type epoxy resin, a urethane modified bisphenol A-type epoxy resin, and an isocyanate modified bisphenol A-type epoxy resin, or a mixture thereof.

An epoxy equivalent weight (EEW) of the epoxy resin is not particularly limited, but may be 500 g/eq to 1,300 g/eq, for example, 700 g/eq to 1,100 g/eq. When the epoxy resin has an epoxy equivalent weight in the ranges described above, excellent durability may be achieved.

The viscosity and softening point of the epoxy resin are not particularly limited, but the epoxy resin may have a viscosity (170° C.) of 10 poise to 80 poise, for example 20 poise to 50 poise, and a softening point of 80° C. to 120° C., for example, 90° C. to 110° C. When the epoxy resin has a softening point and a viscosity in the ranges described above, storage stability of the coating composition is excellent, and appearance characteristics and flexibility of a coating film are improved, which may lead to minimizing the occurrence of cracking in the coating film.

A weight average molecular weight of the epoxy resin is not particularly limited, but may be 4,000 g/mol to 10,000 g/mol, for example, 5,000 g/mol to 8,000 g/mol. When the epoxy resin has a weight average molecular weight in the ranges described above, excellent durability may be achieved.

The epoxy resin may be included in an amount of 45 wt % to 80 wt %, for example, 55 wt % to 65 wt % with respect to a total weight of the powder coating composition. When the epoxy resin is included in an amount of less than 45 wt %, heat resistance may deteriorate due to a decrease of the glass transition temperature of the coating film, and when the epoxy resin is included in an amount of greater than 80 wt %, mechanical properties may deteriorate.

Curing Agent

The powder coating composition of the present invention may comprise at least one of an amine-based curing agent and a phenol-based curing agent as a curing agent.

The amine-based curing agent may process a curing reaction with the epoxy resin to improve degree of curing for a coating film, thereby enhancing flexibility of the coating film compared to other curing agents. The amine-based curing agent is not particularly limited as long as it is an amine-based curing agent that is reactive in a curing reaction with an epoxy resin. For example, there are an aliphatic amine-based curing agent, an alicyclic amine-based curing agent, an aromatic amine-based curing agent, etc., which may be used alone or in combination of two or more.

An amine value of the amine-based curing agent is not particularly limited, and may be, for example, 15 mgKOH/g to 30 mgKOH/g. An active hydrogen equivalent weight of the amine-based curing agent is not particularly limited, and may be, for example, 10 g/eq to 50 g/eq. When the amine-based curing agent has an amine value and an active hydrogen equivalent weight in the ranges described above, excellent corrosion resistance may be achieved.

Non-limiting examples of the amine-based curing agent, which may be used, include 4,4'-diamino diphenyl sulfone, 4,4'-diamino diphenyl methane, dicyandiamide, etc. For example, the amine-based curing agent may be dicyandiamide.

For the phenol-based curing agent, those commonly used in the powder coating field may be used without limitation. A hydroxyl equivalent weight of the phenol-based curing agent is not particularly limited, and may be, for example, 200 g/eq to 300 g/eq.

Non-limiting examples of the phenol-based curing agent, which may be used, include a resol-type phenol-based resin, a novolac-type phenol-based resin, a polyhydroxystyrene resin, etc. Examples of the resol-type phenol-based resin include an aniline-modified resol resin, a melamine-modified resol resin, etc. Examples of the novolac-type phenol-based resin include a phenol novolac resin, a cresol novolac resin, a tert-butylphenol novolac resin, a nonylphenol novolac resin, a naphthol novolac resin, a dicyclopentadiene-modified phenolic resin, a terpene-modified phenol-based resin, a triphenol methane-type resin, a naphthol aralkyl resin, etc. Examples of the polyhydroxystyrene resin include poly(p-hydroxystyrene), etc.

The curing agent may be included in an amount of 0.1 wt % to 10 wt %, for example, 0.1 wt % to 3 wt % with respect to a total weight of the powder coating composition. When the curing agent is included in an amount in the ranges described above, the coating film has a high curing degree, and may thus have improved properties.

Pigment

The powder coating composition of the present invention may comprise, as a pigment, a typical extender pigment, or a typical color pigment which is known in the art, or a mixture thereof.

The extender pigment fills pores in a coating film, complements the formation of the coating film, and serve to provide build-up or mechanical properties to the coating film. Therefore, when the extender pigment is included, satisfactory coating film appearance may be obtained, and hardness, impact resistance, rust resistance, etc. may be improved.

For the extender pigment, those commonly used in powder coating compositions may be used without limitation, and examples thereof include calcium carbonate, clay, talc, magnesium silicate, kaolin, mica, silica, aluminum silicate, aluminum hydroxide, barium sulfate, etc. The components described above may be used alone or in combination of two or more.

An average particle size of the extender may be controlled within the ranges of a typical average particle size used in the art, and may be 1.0 μm to 8.0 μm, for example, 2.5 μm to 6.5 μm. When the average particle size of the extender pigment satisfies the ranges described above, boiling water resistance and long-term cathodic disbondment resistance of the coating film are improved, thereby securing excellent corrosion resistance.

The color pigment may be used to express a desired color in the powder coating or to increase strength or gloss of the coating film. For the pigment, an organic pigment, an inorganic pigment, a metallic pigment, aluminum-paste, pearl, etc. commonly used in powder coatings may be used without limitation, and may be used alone or in a combination of two or more. Non-limiting examples of the pigment, which may be used, include azo-based, phthalocyanine-based, iron oxide-based, cobalt-based, carbonate-based, sulfate-based, silicate-based, chromate-based pigments, etc., for example, titanium dioxide, zinc oxide, bismuth vanadate, cyanine green, carbon black, iron oxide, iron sulfur oxide, navy blue, cyanine blue, and a mixture of two or more thereof. For example, the pigment may be titanium dioxide.

The pigment may be included in an amount of 15 wt % to 50 wt %, for example, 30 wt % to 45 wt % with respect to a total weight of the powder coating composition. When the pigment is included in the ranges described above, color expression of the coating film may be excellent, and mechanical properties, impact resistance, adhesion properties, etc., of the coating film may be improved.

Catalyst

The powder coating composition of the present invention may further comprise a catalyst commonly used in the powder coating field.

The catalyst is a material facilitating a reaction between the epoxy resin, which is a main resin, and a curing agent, and for example, an imidazole-based catalyst, a phosphonium-based catalyst, an amine-based catalyst, a metal-based catalyst, etc., may be used alone or in a combination of two or more. For example, the catalyst may be an imidazole-based catalyst.

Non-limiting examples of the imidazole-based catalyst include aliphatic imidazole compounds such as imidazole, 1-methylimidazole, 2-methylimidazole, 1,2-dimethylimidazole, 1,5-dimethylimidazole, 2-ethylimidazole, 2-butylimidazole, 2-decylimidazole, 2-hexylimidazole, 2-isopropylimidazole, 2-undecylimidazole, 2-heptanedecylimidazole, 2-ethyl-4-methylimidazole, 2-butyl-5-chloro-1H-imidazole-4-carbaldehyde, vinylimidazole, 1,1-carbonyldiimidazole, 1-cyanoethyl-2-methylimidazole, 1-cyanoethyl-2-ethyl-4-methylimidazole, 1-cyanoethyl-2-undecylimidazole, 1-cyanoethyl-2-undecyl-imidazole trimellitate, 2,4-diamino-6-(2'-methylimidazole-(1')-ethyl-s-triazine, 4,4'-methylene-bis-(2-ethyl-5)-methylimidazole), 2-aminoethyl-2-methylimidazole, and imidazole-containing polyamide. These may be used alone or in mixture of 2 or more.

Another example of the imidazole-based catalyst includes aromatic imidazole compounds such as 2-phenylimidazole, 2-phenyl-2-imidazoline, 2-phenyl-4-methylimidazole, 1-benzyl-2-methylimidazole, 1-benzyl-2-phenylimidazole, 1-cyanoethyl-2-phenylimidazole, 1-cyanoethyl-2-phenyl imidazole trimellitate, 2-phenyl-4,5-dihydroxymethylimidazole, 2-phenyl-4-methyl-5-hydroxymethylimidazole, 2-phenyl-4-benzyl-5-hydroxymethylimidazole, 1-cyanoethyl-2-phenyl-4,5-di(cyanoethoxymethyl) imidazole, and 1-dodecyl-2-methyl-3-benzylimidazolinium chloride. These may be used alone or in mixture of 2 or more.

Non-limiting examples of the phosphonium-based catalyst include triphenylphosphine, benzyltriphenylphosphonium chloride, butyltriphenylphosphonium chloride, tetraphenylphosphonium chloride, etc. In addition, climbazole, tert-butyl dimethylsilyl chloride, etc., may be used.

The catalyst of the powder coating composition according to the present invention may comprise an aliphatic imidazole compound and an aromatic imidazole compound. For example, the catalyst of the powder coating composition according to the present invention may comprise an aliphatic imidazole compound and an aromatic imidazole compound in a weight ratio of 0.1 to 3:1, for example 0.25 to 2.5:1. When the aliphatic imidazole compound and the aromatic imidazole compound are used in combination in the ranges described above, appearance and corrosion resistance of the coating film may be improved.

The catalyst may be included in an amount of 0.01 wt % to 10 wt %, for example, 0.1 wt % to 5 wt % with respect to a total weight of the powder coating composition. When the amount of the catalyst is beyond the ranges, mechanical properties of the coating film may deteriorate.

Additive

The powder coating composition of the present invention may further optionally include an additive commonly used in the powder coating field within ranges that do not hurt intrinsic properties of the composition.

Non-limiting examples of the additive, which may be used in the present invention include a pinhole inhibitor, a leveling agent, wax, a low-stressing agent, a dispersant, a flowability improver, an anti-cratering agent, a coupling agent, a gloss control agent, an adhesion improver, a flame retardant, a matting agent, a light absorber, etc., which may be used alone or in combination of two or more.

The powder coating composition of the present invention may further include at least one selected from the group consisting of a leveling agent, a pinhole inhibitor, a dispersant, and a coupling agent.

The leveling agent serves to improve appearance characteristics of a coating film and enhance adhesion in the composition through leveling to achieve even and smooth application of the coating composition. For example, the leveling agent includes acrylic-based, silicone-based, polyester-based, amine-based leveling agents, etc., but is not particularly limited thereto The pinhole inhibitor may cause volatile substances to be released from a coating film during the curing process, thereby preventing pinholes from occurring in the coating film and improving appearance characteristics. Non-limiting examples of the pinhole inhibitor include amide-based, polypropylene-based, and stearic acid-based pinhole inhibitors. For example, the pinhole inhibitor may be a benzoin pinhole inhibitor or a mixture of a benzoin pinhole inhibitor and an amide-based pinhole inhibitor.

For the dispersant, typical dispersants known in the art may be used without limitation, and for example, a polyacrylic dispersant that is adsorbed on a surface of a color pigment to maximize degassing may be used.

The coupling agent is a material for enhancing adhesion of the coating film, and a silane-based compound such as mercaptoalkylakoxysilane and gammaglydoxypropyltrimethoxysilane may be used.

The additive may be added within amount ranges known in the art, for example, in an amount of 0.1 wt % to 10 wt %, with respect to a total weight of the powder coating composition. When the additive is included in an amount within the ranges described above, the appearance and hardness of the coating film may be improved.

The powder coating composition according to the present invention may be prepared through methods known in the art, and for example, the powder coating composition according to the present invention may be prepared through processes such as raw material weighing, dry pre-mixing, dispersion, coarse pulverization, pulverization and classification.

For example, a raw material mixture containing an epoxy resin, a curing agent, a pigment, a catalyst, and optionally an additive, etc. is put into a container mixer and uniformly mixed, and the mixed composition is melt-mixed and then pulverized, thereby obtaining a powder coating composition according to the present invention. For example, the raw material mixture is melt-dispersed at 70° C. to 130° C. using melt-kneading devices such as a kneader or an extruder to produce chips having a predetermined thickness (e.g., 1 mm to 5 mm), and then, the prepared chips may be pulverized to a range of 40 μm to 80 μm using pulverizing devices such as a high-speed mixer, and classified, thereby obtaining a powder coating composition.

The classification process is not particularly limited, and, for example, may be performed through filtering with 80 mesh to 120 mesh. Accordingly, a powder coating having an average particle size of 40 μm to 80 μm may be obtained. The average particle size of the powder is not particularly limited, but when the average particle size satisfies the range described above, coating workability and appearance characteristics of the coating film may be improved.

In order to improve the fluidity of the powder coating, surfaces of the powder coating particles according to the present invention may be coated with fine powder such as silica. As a method of performing such process, a pulverization mixing method in which fine powder is added and mixed during pulverization, or a dry mixing method using a Henschel mixer, etc. may be used.

MODE FOR CARRYING OUT THE INVENTION

Hereinafter, the present invention will be described in more detail through embodiments. Embodiments shown below are illustrated only for the understanding of the present invention, and the scope of the present invention is not limited thereto in any sense.

EXAMPLES 1 TO 10

According to compositions shown in Table 1 below, each component was put into a mixing tank and premixed, and then melt-dispersed at 100° C. in a disperser to prepare chips. The prepared chips were pulverized with a high-speed mixer, thereby obtaining powder coating compositions of Examples 1 to 10 having an average particle size of 40 μm to 80 μm. In Table 1 below, the usage unit of each composition is wt %.

COMPARATIVE EXAMPLES 1 TO 6

Powder coating compositions of Comparative Examples 1 to 6 were prepared in the same manner as in Examples 1 to 10, except that each component was used according to compositions shown in Table 2 below. In Table 2 below, the usage unit of each composition is wt %.

TABLE 1

| | Examples | | | | | | | | | |
|---|---|---|---|---|---|---|---|---|---|---|
| | 1 | 2 | 3 | 4 | 5 | 6 | 7 | 8 | 9 | 10 |
| Epoxy Resin 1 | 63.1 | 62.3 | 56.3 | 55.7 | | | 63.1 | 56.3 | | |
| Epoxy Resin 2 | | | | | 63.1 | | | | 63.1 | |
| Epoxy Resin 3 | | | | | | 56.3 | | | | 56.3 |
| Curing agent | 1.1 | 1.1 | 1 | 0.97 | 1.1 | 1 | 1.1 | 1 | 1.1 | 1 |
| Pigment 1 | 1.9 | 1.86 | 1.7 | 1.71 | 1.9 | 1.7 | 1.9 | 1.7 | 1.9 | 1.7 |
| Pigment 2 | 0.2 | 0.2 | 0.18 | 0.19 | 0.2 | 0.18 | 0.2 | 0.18 | 0.2 | 0.18 |
| Pigment 3 | 32.1 | 31.7 | 39.4 | 38.9 | 32.1 | 39.4 | 32.1 | 39.4 | | |
| Pigment 4 | | | | | | | | | 32.1 | |
| Pigment 5 | | | | | | | | | | 39.4 |
| Catalyst 1 | 0.5 | 0.78 | 0.49 | 0.41 | 0.5 | 0.49 | 0.4 | 0.4 | 0.5 | 0.49 |
| Catalyst 2 | 0.3 | 1.3 | 0.21 | 1.4 | 0.3 | 0.21 | 0.4 | 0.3 | 0.3 | 0.21 |
| Additive 1 | 0.4 | 0.38 | 0.36 | 0.36 | 0.4 | 0.36 | 0.4 | 0.36 | 0.4 | 0.36 |
| Additive 2 | 0.4 | 0.38 | 0.36 | 0.36 | 0.4 | 0.36 | 0.4 | 0.36 | 0.4 | 0.36 |
| Total | 100 | 100 | 100 | 100 | 100 | 100 | 100 | 100 | 100 | 100 |

TABLE 2

| | Comparative Examples | | | | | |
|---|---|---|---|---|---|---|
| | 1 | 2 | 3 | 4 | 5 | 6 |
| Epoxy Resin 1 | 63.1 | 63.4 | 63.4 | 63.1 | 63.1 | 56.3 |
| Curing agent | 1.1 | 1.1 | 1.1 | 1.1 | 1.1 | 1 |
| Pigment 1 | 1.9 | 1.9 | 1.9 | 1.9 | 1.9 | 1.7 |
| Pigment 2 | 0.2 | 0.2 | 0.2 | 0.2 | 0.2 | 0.18 |
| Pigment 3 | | 32.3 | | 32.1 | 32.1 | 39.4 |
| Pigment 6 | 32.1 | | 32.3 | | | |
| Catalyst 1 | 0.5 | 0.3 | 0.3 | 0.8 | | |
| Catalyst 2 | 0.3 | | | | 0.8 | 0.7 |
| Additive 1 | 0.4 | 0.4 | 0.4 | 0.4 | 0.4 | 0.36 |
| Additive 2 | 0.4 | 0.4 | 0.4 | 0.4 | 0.4 | 0.36 |
| Total | 100 | 100 | 100 | 100 | 100 | 100 |

Epoxy resin 1: Bisphenol A epoxy resin (epoxy equivalent weight of 950 g/eq, viscosity of 35 poise (based on melting at 170° C.), softening point of 100° C., weight average molecular weight of 6,300 g/mol)

Epoxy resin 2: Bisphenol A epoxy resin (epoxy equivalent weight of 750 g/eq, viscosity of 25 poise (based on melting at 170° C.), softening point of 90° C., weight average molecular weight of 5,100 g/mol)

Epoxy resin 3: Bisphenol A epoxy resin (epoxy equivalent weight of 1,100 g/eq, viscosity of 45 poise (based on melting at 170° C.), softening point of 110° C., weight average molecular weight of 7,800 g/mol)

Curing agent: Dicyandiamide (amine value of 20 mgKOH/g, active hydrogen equivalent weight: 21 g/eq)

Pigment 1: Titanium dioxide (SINOCHEM)

Pigment 2: Carbon black (MITSUBISHI CHEMICAL)

Pigment 3: Barium sulfate (SIBELCO, average particle size of 2.5 μm to 4.5 μm)

Pigment 4: Barium sulfate (SIBELCO, average particle size of 4.5 μm to 6.5 μm)

Pigment 5: Barium sulfate (SIBELCO, average particle size of 1.0 μm to 2.5 μm)

Pigment 6: Barium sulfate (SIBELCO, average particle size of 11 μm to 13 μm)

Catalyst 1: 2-methylimidazole (EVONIK)

Catalyst 2: 2-phenyl-2-imidazoline (EVONIK)

Additive 1: BYK-360P (BYK, leveling agent)

Additive 2: [3-(2,3-epoxypropoxy)propyl]-triethoxysilane (D.O.G, coupling agent)

EXPERIMENTAL EXAMPLE

Evaluation of Properties

Properties of the powder coating compositions prepared in Examples 1 to 10 and Comparative Examples 1 to 6, respectively, were measured as follows, and the results are shown in Tables 3 and 4 below.

Specimen Preparation

A steel of 100 mm (width)×100 mm (length)×6 mm (thickness) was prepared, and subjected to grit blasting surface treatment.

Appearance (Leveling)

The powder coating compositions prepared according to Examples 1 to 10 and Comparative Examples 1 to 6 were electrostatically spray applied on the prepared specimen to have a thickness of 400 μm. The appearance of the coating film formed on each specimen was visually inspected.

(ratings—⊚: Excellent, ○: Good, Δ: Normal, X: bad)

Adhesion

The powder coating compositions prepared according to Examples 1 to 10 and Comparative Examples 1 to 6 were electrostatically spray applied on the prepared specimen to have a thickness of 400 μm. Based on ASTM D4541 standards, Dolly was attached to each specimen, and then pressure was applied thereto to measure pressure when the coating film fell.

Flexibility

Short specimens (size: 200 mm×25 mm×6 mm) were prepared, and preheated at 230° C. for at least 40 minutes, and then using a coating gun, the powder coating compositions according to Examples 1 to 10 and Comparative Examples 1 to 6 were applied on the preheated specimens to have a coating film thickness of 400 μm. Thereafter, the temperature of each specimen was set to 10° C., and flexibility (3.75° bending) was measured using a bending tester.

Boiling Water Resistance

The prepared specimen was preheated to 230° C., and then the powder coating compositions according to Examples 1 to 10 and Comparative Examples 1 to 6 were applied on the steel surface through an electrostatic spray method to have a coating film thickness of 350 μm, thereby obtaining a specimen. Thereafter, each specimen was immersed in a water bath at 75° C., taken out after 48 hours, and cooled to room temperature for 1 hour, and then a rectangular shape of 15 mm in width and 30 mm in length was scraped with a knife until a substrate is exposed, the knife was pushed between the coating film and the substrate around the exposed portion of the substrate to measure the adhesion using the principle of the lever, and evaluate ratings according to a disbondment area.

The evaluation results are classified into ratings 1, 2, 3, 4, and 5. Rating 1 indicates a case of no coating film disbondment, rating 2 indicates a case when disbondment of the coating film is within 50%, rating 3 indicates a case when disbondment of the coating film is 50% or more, rating 4 indicates a case when disbondment of the coating film is easily done into large pieces, and rating 5 indicates a case when disbondment of the coating film is easily done in one piece at once.

Cathodic Disbondment Resistance

The powder coating compositions prepared according to Examples 1 to 10 and Comparative Examples 1 to 6 were electrostatically spray applied on the prepared specimens to have a thickness of 400 μm. Holes having a diameter of 3 mm were punched at centers of the specimens, a 3% concentration of brine was added to contact coating film surfaces, evaporation was prevented using a container, and then, a voltage of 1.5 V was respectively applied to substrates at 65° C. for 30 days to measure disbondment distances from the holes. It may be interpreted that the greater the disbondment distance, the poorer the adhesion of the powder coating composition with respect to the substrate. The specimen preparation and property evaluation method were performed in accordance with CSA Z245.20, a Canadian standard for pipes.

to the present invention had superior overall properties to the coating films formed of the powder coating compositions of Comparative Examples 1 to 6. In particular, it was confirmed that the coating films formed of the powder coating compositions of Examples 1 to 10 had excellent boiling water resistance and cathodic disbondment resistance, and ensured satisfactory corrosion resistance.

INDUSTRIAL APPLICABILITY

The present invention provides a powder coating composition having excellent corrosion resistance. In particular, when the powder coating composition according to the present invention is applied to steel pipes, boiling water resistance and cathodic disbondment resistance are enhanced to achieve stable long-term corrosion resistance quality.

The invention claimed is:

1. A powder coating composition comprising an epoxy resin, a curing agent, a pigment, and a catalyst,
   wherein the pigment comprises an extender pigment having an average particle size of 1.0 μm to 8.0 μm, and
   the catalyst comprises an aliphatic imidazole compound and an aromatic imidazole compound, and a mixing ratio of the aliphatic imidazole compound to the aromatic imidazole compound is from 0.1:1 to 3:1 by weight.

2. The powder coating composition of claim 1, wherein the curing agent is an amine-based curing agent having an amine value of 15 mgKOH/g to 30 mgKOH/g and an active hydrogen equivalent weight of 10 g/eq to 50 g/eq.

TABLE 3

| Test items | Test conditions | Examples | | | | | | | | | |
|---|---|---|---|---|---|---|---|---|---|---|---|
| | | 1 | 2 | 3 | 4 | 5 | 6 | 7 | 8 | 9 | 10 |
| Appearance (leveling) | Visual inspection | ◎ | ○ | ◎ | ○ | ◎ | ◎ | ◎ | ○ | ○ | ○ |
| Adhesion | ASTM D4541(psi) | 1,650 | 1,550 | 1,600 | 1,600 | 1,700 | 1,500 | 1,650 | 1,650 | 1,550 | 1,500 |
| Flexibility | 3.75°/PD @ 10° C. | No cracks | No cracks | No cracks | No cracks | No cracks | No cracks | No cracks | No cracks | No cracks | No cracks |
| Boiling water resistance | 75° C.* 48 h (rating) | 1 | 1 | 1 | 1 | 1 | 1 | 1 | 1 | 2 | 3 |
| Cathodic disbondment resistance | 1.5 v * 65° C. * 28 d (mm) | 2.8 | 4.2 | 3.0 | 4.3 | 3.6 | 3.5 | 3.2 | 3.1 | 4.3 | 4.8 |

TABLE 4

| Test items | Test conditions | Comparative Examples | | | | | |
|---|---|---|---|---|---|---|---|
| | | 1 | 2 | 3 | 4 | 5 | 6 |
| Appearance (leveling) | Visual inspection | Δ | Δ | Δ | X | Δ | Δ |
| Adhesion | ASTM D4541(psi) | 1,450 | 1,500 | 1,600 | 1,500 | 1,500 | 1,500 |
| Flexibility | 3.75°/PD @ 10° C. | Cracking observed | No cracks | Cracking observed | No cracks | No cracks | No cracks |
| Boiling water resistance | 75° C.* 48 h (rating) | 4 | 3 | 4 | 3 | 4 | 4 |
| Cathodic disbondment resistance | 1.5 v * 65° C. * 28 d (mm) | 10.2 | 9.8 | 12.3 | 9 | 9.8 | 10.4 |

As shown in Tables 3 to 4, the coating films formed of the powder coating compositions of Examples 1 to 10 according 3. The powder coating composition of claim 1, wherein the extender pigment comprises at least one selected from the group consisting of calcium carbonate, clay, talc, magnesium silicate, kaolin, mica, silica, aluminum silicate, aluminum hydroxide, and barium sulfate.

4. The powder coating composition of claim 1, comprising 45 wt % to 80 wt % of the epoxy resin, 0.1 wt % to 10 wt % of the curing agent, 15 wt % to 50 wt % of the pigment, and 0.01 wt % to 10 wt % of the catalyst, with respect to a total weight of the powder coating composition.

\* \* \* \* \*